United States Patent [19]

Mihara et al.

[11] Patent Number: 4,814,913
[45] Date of Patent: Mar. 21, 1989

[54] COMPACT MAGNETIC DISC ASSEMBLY

[75] Inventors: Takahisa Mihara; Sigeo Saito, both of Sagamihara, Japan

[73] Assignee: Fujitsu Limited, Kawasaki, Japan

[21] Appl. No.: 75,756

[22] Filed: Jul. 20, 1987

[30] Foreign Application Priority Data

Jul. 18, 1986 [JP] Japan .............. 61-109458[U]

[51] Int. Cl.$^4$ ............................... G11B 17/02
[52] U.S. Cl. .................. 360/78.12; 360/98.07
[58] Field of Search .......................... 360/98

[56] References Cited

U.S. PATENT DOCUMENTS 4,367,502 1/1983 Iftikar et al. .............. 360/98
4,714,972 12/1987 Biermeier et al. ............. 360/98

FOREIGN PATENT DOCUMENTS 57-191872 11/1982 Japan .
60-35319 3/1985 Japan .
60-35320 3/1985 Japan .

OTHER PUBLICATIONS

Nikkei Electronics, 1985.9.23, pp. 153–172.

Primary Examiner—Robert S. Tupper
Attorney, Agent, or Firm—Staas & Halsey

[57] ABSTRACT

A magnetic disc device comprising a case composed of a base and a cover; a plurality of magnetic discs housed within the case; a plurality of magnetic heads for read-/write operations and conducting a seeking motion on each magnetic disc surface; and arms for driving the magnetic heads, wherein a recess for accommodating a printed circuit board is formed on the outer surface of the base in an area outside of the range of movement of the magnetic heads and the arms.

10 Claims, 4 Drawing Sheets

COMPACT MAGNETIC DISC ASSEMBLY

BACKGROUND OF THE INVENTION

1. Field of the Invention

The present invention relates to a compact magnetic disc assembly used as a memory means for, for example, a mini-computer or a micro-computer.

Conventionally, a magnetic disc assembly using a hard disc 3.5 inches in diameter is used as such a memory means, and is required to have a high memory density.

2. Description of the Related Art

A prior art magnetic disc device comprises magnetic discs rotatably supported within a case, magnetic heads for read/write operations on the magnetic discs, and a head actuator for driving the magnetic heads on the magnetic disc surface to read/write information data from and to the magnetic disc.

The above-mentioned prior art magnetic disc device can hold only one or two magnetic discs, and this does not meet the present requirements for a high memory density. However, if the number of magnetic discs is increased, in order to enrich the memory density, the overall height of the magnetic disc device must be increased. Thus, compatibility with conventional magnetic disc devices is lost.

Also, the prior art magnetic disc device comprises a printed circuit board of substantially the same size as the base of the case and attached to the outside of the base. Various control circuits for driving the magnetic disc device are mounted on the printed circuit board.

Regarding the magnetic disc device using 5 inch diameter discs, all of the necessary control circuits can be mounted on one printed circuit board, since the case is relatively large, so that a large printed circuit board is attached to the case. However, for the magnetic disc device using 3.5 inch diameter discs, all of the control circuits cannot be mounted on one printed circuit board having a relatively small size corresponding to the small sized case. Therefore, two printed circuit boards must be attached to the outside of the case, which increases the height of the magnetic disc device and impedes the realization of a small and compact magnetic disc device.

SUMMARY OF THE INVENTION

The present invention was created to alleviate the above-mentioned problem, and the object thereof is to provide a magnetic disc device having a high memory density without increasing the height thereof.

The present invention especially realizes a half-height type magnetic disc device comprising a swing type actuator and four magnetic discs housed therein.

The height dimension of the magnetic disc device is commercially standardized and a full-height type magnetic disc device is marketed. Also, a half-height type magnetic disc device has been developed to realize a small size magnetic disc device which is compatible with the full-height type magnetic disc device, and advantageous from the standpoint of space saving since the height is a half of that of the full-height type magnetic disc device.

On the other hand, when the capacity of the magnetic disc device is to be increased using an ordinary interface circuit, it is desirable to double the number of the discs, from the standpoint of easy installation of a new magnetic disc device having an increased capacity in place of an old device, since it is easy to exchange an old device with a new one and/or simultaneously use a new device with an old one through an ordinary interface circuit. Therefore, a two-disc magnetic disc device was developed as an improvement on a one-disc magnetic disc device. Subsequently, a magnetic disc device comprising four discs has been developed as an improvement on the two-disc device.

The present invention makes it possible to house four discs in a half-height type magnetic disc device, which could not be realized by the prior art device, since four discs could not be stacked in the shortened half-height type device housing of the prior art structure.

In cccordance with the present invention, there is provided a magnetic disc device comprising: a case having a base; a plurality of magnetic discs; a plurality of magnetic heads; a head actuator; a motor for driving a spindle of said magnetic discs; a printed circuit board for driving said motor; and a main printed circuit board mounting a read/write circuit for the magnetic discs, said magnetic discs and said magnetic heads and said head actuator being housed within said case; and said motor, said printed circuit board for driving the motor and said main printed circuit board being disposed outside of said base of the case, wherein a recess is provided on the outside of said base in an area opposite to said head actuator with respect to the spindle drive motor, said printed circuit board for driving the motor being disposed within said recess, thus reducing the height of the device and realizing a compact magnetic disc device having a high memory density.

By the provision of the recess on the outside of the base in the area opposite to the head actuator with respect to the motor and disposing therein the printed circuit board for driving the motor, it is possible to accommodate a greater number of discs than in the prior art structure within the case without increasing the height thereof, since the printed circuit board is disposed in the area outside of the range of movement of the magnetic heads.

DESCRIPTION OF THE PREFERRED EMBODIMENTS

Figure 1C:
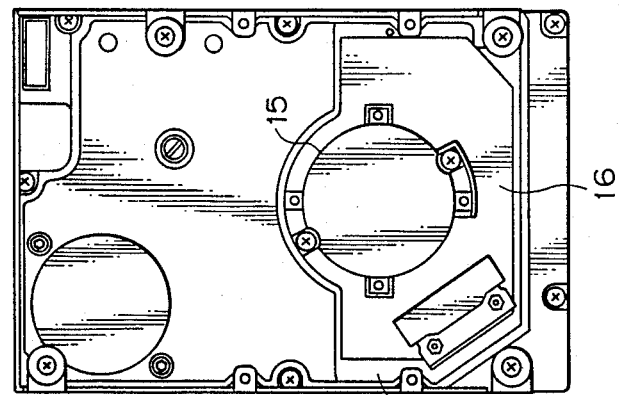
FIG. 1c is a bottom view of the magnetic disc device according to the present invention with the main printed circuit board removed.
Figure 1B:
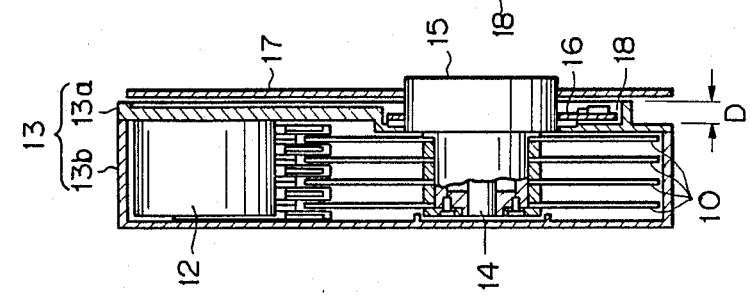
FIG. 1b is a sectional view of the magnetic disc device according to the present invention.
Figure 1A:
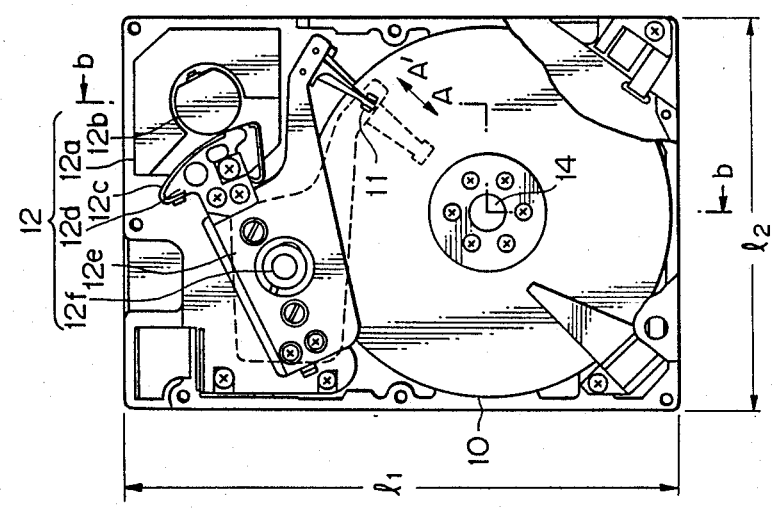
FIG. 1a is a top view of the magnetic disc device according to the present invention, with the cover removed.
Figure 2:
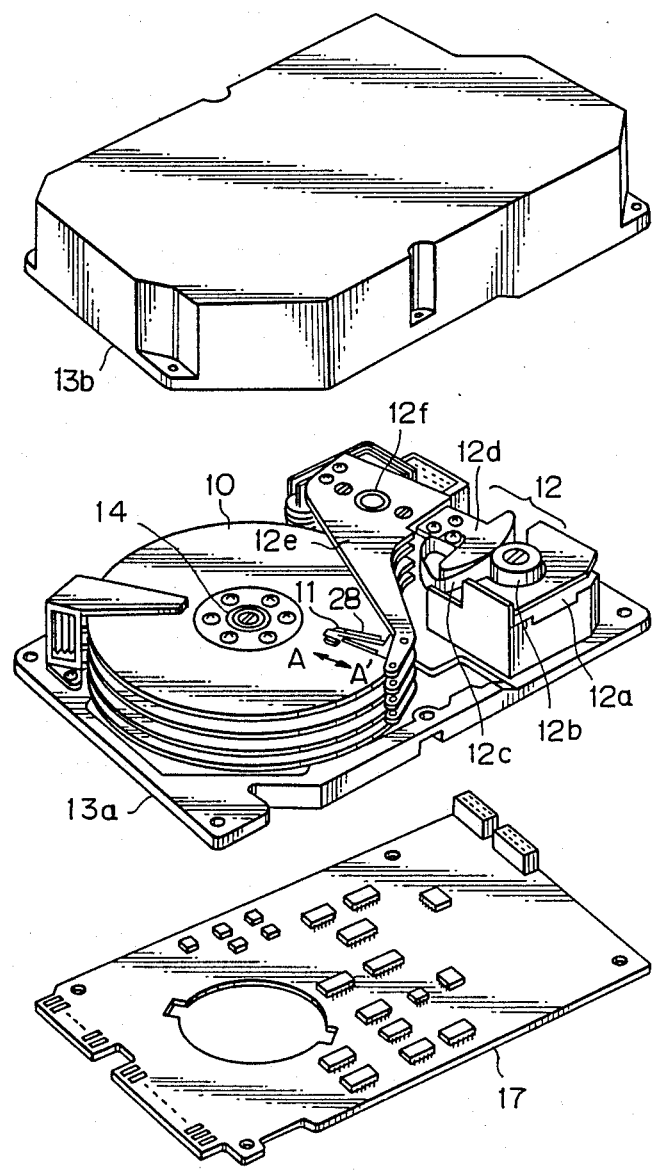
FIG. 2 is a perspective view of the magnetic disc device according to the present invention when disassembled.

FIGS. 1 and 2 illustrate an embodiment of the present invention, wherein FIG. 1a is a view of the device from above, with the cover thereof removed, FIG. 1b is a sectional view along the line b—b of FIG. 1a, FIG. 1c is a view of the device from below with the main printed circuit board removed, and FIG. 2 is a view of the device when disassembled.

As illustrated in FIGS. 1 and 2, a magnetic disc device according to the present invention comprises: a housing (case 13) formed by a base 13a and a cover 13b; four magnetic discs 10 secured to a spindle 14; eight magnetic heads 11 for magnetic read/write operations at the upper and lower surfaces of each magnetic disc 10; and a head actuator 12 for swinging the magnetic heads 11 in the direction of the arrow AA' on the magnetic disc surface. The head actuator 12 comprises a drive motor 12a, a capstan 12b, a steel belt 12c, a sector 12d, head arms 12e, and a pivot 12f. Outside of the base 13a are disposed a spindle drive motor 15, a sub-printed circuit board 16 for driving the spindle drive motor 15, and a main printed circuit board 17 mounting a read/write circuit for reading data from and writing data to the magnetic disc. A recess 18 is formed on the outside of the base 13a in an area opposite to the head actuator 12 with respect to the spindle drive motor 15. The sub-printed circuit board 16 for driving the motor 15 is disposed in the recess 18 and secured therein with a flange of the motor 15, which flange is also disposed in the recess 18. The magnetic head 11 is attached to an end of the head arm 12e through a gimbal spring and a load spring 28. On the main printed circuit board 17 are mounted an interface circuit, a read/write circuit and a servo control circuit for positioning the magnetic heads 11. It is preferable to dispose a disc spindle drive circuit on the sub-printed circuit board 16, since the sub-printed circuit board 16 is located in the vicinity of the spindle drive motor 15.

With this structure, the sub-printed circuit board 16 can be accommodated without interfering with the head actuator 12 and the magnetic head 11, since the recess 18 isprovided on the base 13a at an area opposite to the head actuator 12 with respect to the spindle drive motor 15, outside of the range of movement of the head actuator 12 and the magnetic head 11. Therefore, it is possible to accommodate four magnetic discs 10 without increasing the height of the device housing, and thus realize a compact magnetic disc assembly having a high memory density.

Figure 3:
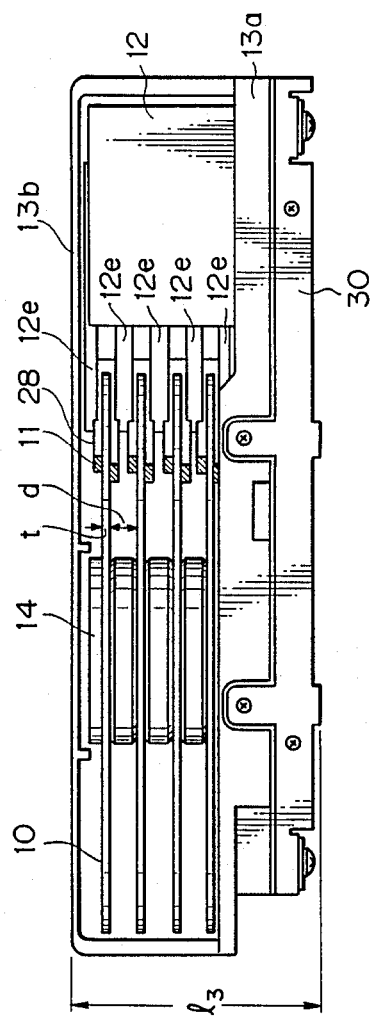
FIG. 3 is a sectional view of the magnetic disc device according to the present invention, with the bottom plate attached.

The magnetic disc assembly illustrated in FIG. 1a is seen from above, with the cover removed, and FIG. 3 shows a vertical section thereof with the bottom plate attached. This magnetic disc assembly is of a half-height type having a commercially standardized outer shape dimension and using 3.5 inch discs. That is, the disc diameter is 95 mm, the longitudinal length of the device $l_1=146\pm0.5$ mm, the lateral length $l_2=101.6 \pm0.5$ mm, and the height $l_3=41.3\pm0.3$ mm. A bottom plate 30 (FIG. 3) for covering the main printed circuit board 17 is disposed below the base 13a and secured thereto together with the main printed circuit board 17 by screws. The height $l_3$ is the dimension between the lowest surface of the bottom plate 30 and the top surface of the cover 13b. The gap d between the adjacent magnetic discs 10 is 4.5 mm, and the thickness t of each magnetic disc 10 is 1.27 mm. Five head arms 12e are arranged to conduct a seeking motion on both surfaces of the four magnetic discs 10, as shown in FIG. 3. The thickness of the two uppermost and lowermost head arms is 2.0 mm, and the thickness of the three intermediate head arms is 2.8 mm. The tip of each head arm 12e is thinned to 1.154 mm to allow the load spring 28 to be attached. The gap between the lower surface of the lowermost magnetic disc 10 and the upper surface of the base 13a is 3.5 mm.

The head arms 12e and the magnetic head 11 conduct a seeking motion, in the direction shown by the arrows A—A', on the disc surface between the position of solid line and the position of dash line, as illustrated in FIG. 1a. Therefore, a space (gap) must be provided to allow movement of the head arm and the magnetic head when seeking the lower surface of the lowermost magnetic disc, between the base 13a and the lowermost disc. However, it is unnecessary to provide such a gap in the area outside of the range of movement of the arm and the head. Therefore, in accordance with the present invention, a recess 18 is formed on the outside (underside) of the base in the area outside of the range of movement of the arm and the head. The inner side (upper side) of the base protrudes inward (upward) corresponding to the thickness of the lowermost arm and the head. The depth D of this recess 18 is 4.7 mm (approximately 5 mm) (FIG. 1b).

Figure 4:
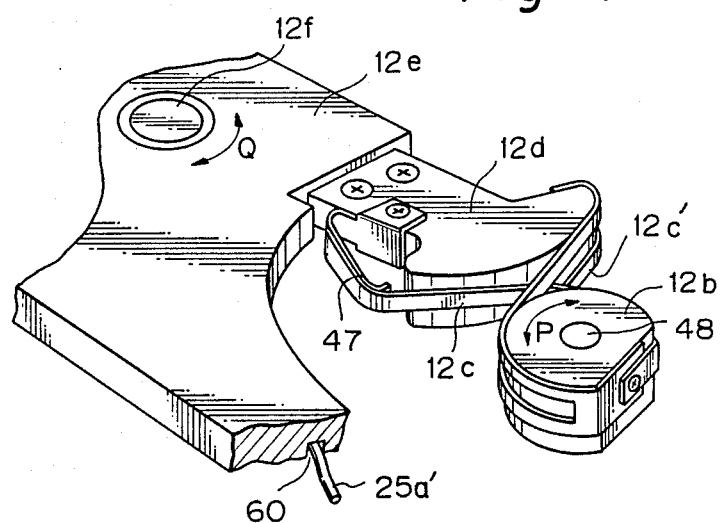
FIG. 4 is a perspective view of a head arm actuating means of the magnetic disc device according to the present invention; and, FIG. 5 is a disassembled view of the head portion of the magnetic disc device according to the present invention.

The swing actuator structure of the head arm 12e is illustrated in detail in FIG. 4. The head arm 12e is rotatable about the pivot 12f, as shown by the arrow Q, and a mushroom-shaped sector 12d is secured to the head arm 12e. A capstan 12b is disposed facing and adjacent to the head of the sector 12d. The capstan 12b is rotatable about a shaft 48, as shown by the arrow P. A tension spring 47 is attached to the stem of the sector 12d, and an end of a steel belt 12c is bonded to the tension spring 47. Another steel belt 12c' is secured to the opposite side of the sector 12d. Both steel belts are wound around the capstan 12b and secured thereto at the back thereof by a screw. Both steel belts may be formed as one integral strip. With this structure, the capstan 12b is rotated as shown by the arrow P to swing the sector 12d through the steel belts 12c, 12c', thus rotating the head arm 12c as shown by the arrow Q about the pivot 12f. Numeral 60 designates a groove for holding the lead cable 25a'.

Figure 5:
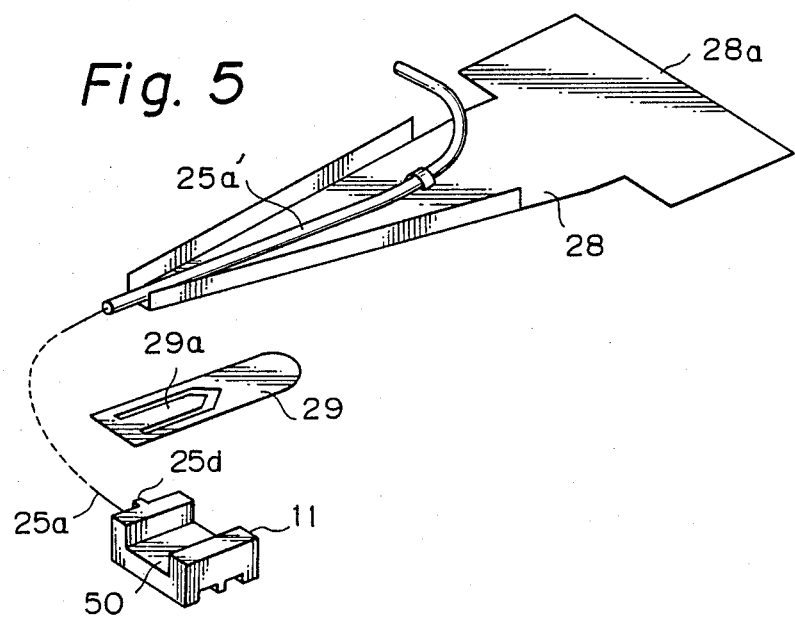

The structure for supporting the magnetic head 11 is illustrated in detail in FIG. 5. The load spring 28 is made from a leaf spring. A gimbal 29 also made from a leaf spring is bonded to an end of the load spring 28 by spot welding. A support piece 29a is formed by cutting the inner area of the gimbal 29. The support piece 29a is bonded to an upper recess surface 50 of the magnetic head 11. The magnetic head 11 has a core 25d on which a coil (not shown) is wound and the coil lead 25a is taken out therefrom. The coil lead 25a is covered by a protecting outer tube to form a lead cable 25a' from the end portion of the load spring 28. The root portion 28a of the load spring 28 is secured to the end of the head arm 12e (FIG. 2).

As mentioned above, in accordance with the present invention, a compact magnetic disc assembly with a high memory density is realized with a simple construction, which is very advantageous in practical use.

Also, it is possible to provide a half-height type 3.5 inch magnetic disc device having four discs accommodated therein.

We claim:
1. A compact magnetic disc assembly comprising:
   a case composed of a base and a cover, each of said base and cover having inner and outer surfaces, said case having a first portion and an adjacent second portion which is non-coextensive with the first portion;

a plurality of magnetic discs housed within said case;

a plurality of magnetic heads for read/write operations and conducting a seeking motion on each magnetic disc surface;

a plurality of arms for supporting and driving said magnetic heads;

head actuator means for driving said magnetic heads through said arms in a range of movement, said head actuator, said magnetic heads and said arms being disposed in said first portion of said case, and said range of movement of said magnetic heads and arms being within said first portion of said case;

a recess formed in the outer surface of said base in the second portion of said case opposite said head actuator means and in an area outside of the range of movement of said magnetic heads and said arms; and a first printed circuit board mounted within the recess.

2. A compact disc assembly according to claim 1, further comprising a second printed circuit board having a size substantially the same as said base and being attached to the outside of said base and overlying said first printed circuit board mounted within said recess.

3. A magnetic disc device according to claim 2, wherein said magnetic discs are standard 3.5 inch sized discs.

4. A compact disc assembly according to claim 2, wherein said second printed circuit board has an interface circuit, a read/write circuit and a servo control circuit for positioning said magnetic heads mounted thereon and said first printed circuit board has a disc spindle drive circuit mounted thereon.

5. A magnetic disc device according to claim 4, wherein said magnetic discs are standard 3.5 inch sized discs.

6. A compact disc assembly according to claim 1, wherein said magnetic discs are standard 3.5 inch sized discs.

7. A compact disc assembly according to claim 6, wherein the assembly is of half-height type and accommodates four magnetic discs therein.

8. A compact magnetic disc assembly according to claim 1, further comprising a drive motor located within the recess outside the case and a spindle, driven by the motor, for rotatably supporting the plurality of magnetic discs within the casing, the spindle being disposed in the recess in the second portion of said case.

9. A compact disc assembly comprising:

a case composed of a base and cover, each having inner and outer surfaces;

a plurality of magnetic discs housed within said case;

a plurality of magnetic heads for read/write operation and conducting a seeking motion on each magnetic disc surface;

a plurality of arms for supporting and driving said magnetic heads in a range of movement;

a main printed circuit board having a size substantially the same as that of said base and attached to the outer surface of said base;

a sub-printed circuit board; and a recess for accommodating the sub-printed circuit board, and being formed on said outer surface of said base at a position opposite to said magnetic discs in an area outside of the range of movement of said magnetic heads and arms.

10. A compact magnetic disc assembly comprising:

a case having a base;

a plurality of magnetic discs housed within said case;

a plurality of magnetic heads housed within said case;

a head actuator housed within said case;

a spindle for rotatably supporting said magnetic discs within said case;

a motor for driving said spindle and said magnetic discs, said motor being disposed outside of said base of said case;

a main printed circuit board mounting a read/write circuit for said magnetic discs, said main printed circuit board being disposed outside of said base of said case;

a recess provided on an outer surface of said base in which said drive motor for said spindle magnetic discs is mounted; and a sub-printed circuit board for driving said motor, said sub-printed circuit board being disposed within said recess around said drive motor.

* * * * *